United States Patent [19]

Johnen et al.

[11] Patent Number: 5,395,463
[45] Date of Patent: Mar. 7, 1995

[54] METHOD AND ARRANGEMENT FOR REDUCTION ANNEALING OF IRON POWDER

[75] Inventors: Dieter Johnen, Düren-Gürzenich; Viktor Linnemann; Georg Huber, both of Mönchengladbach; Friedrich W. Ischebeck, Erkelenz, all of Germany

[73] Assignee: Mannesmann Aktiengesellschaft, Dusseldorf, Germany

[21] Appl. No.: 30,014

[22] PCT Filed: Sep. 20, 1991

[86] PCT No.: PCT/DE91/00757
§ 371 Date: Mar. 22, 1993
§ 102(e) Date: Mar. 22, 1993

[87] PCT Pub. No.: WO92/05001
PCT Pub. Date: Apr. 2, 1992

[30] Foreign Application Priority Data

Sep. 20, 1990 [DE] Germany .............. 40 30 054.4

[51] Int. Cl.⁶ .............................................. B22F 1/00
[52] U.S. Cl. ........................................ 148/513; 75/505
[58] Field of Search ..................... 148/513; 75/505; 419/31

[56] References Cited

U.S. PATENT DOCUMENTS

| | | | |
|---|---|---|---|
| 4,179,282 | 12/1979 | Rubio | 75/495 |
| 4,205,986 | 7/1980 | Klein | 75/211 |
| 4,448,746 | 5/1984 | Kubo et al. | |

FOREIGN PATENT DOCUMENTS

3439717A1 4/1986 Germany .
3722956 2/1988 Germany .

Primary Examiner—Donald P. Walsh
Assistant Examiner—Anthony R. Chi
Attorney, Agent, or Firm—Cohen, Pontani, Lieberman, Pavane

[57] ABSTRACT

The invention relates to a method for the continuous reduction and soft annealing of water atomized iron powder which is conducted in the form of a loose powder layer through an indirectly heated treatment chamber with a heating zone, a reduction zone, and a cooling zone. For increasing the throughput while reducing the energy and reduction agent required, it is proposed that the powder layer is revolved during the travel through the treatment chamber with continuous mixing at least in the reduction zone, wherein the temperature is 800°–950° C. and that, for-controlling the dewpoint of the furnace atmosphere, fresh reduction gas is permanently introduced directly into the reduction zone.

12 Claims, 5 Drawing Sheets

METHOD AND ARRANGEMENT FOR REDUCTION ANNEALING OF IRON POWDER

BACKGROUND OF THE INVENTION

1. Field of the Invention

The invention relates to a method for reduction annealing of iron powder, produced by water atomizing an iron melt and to an arrangement for carrying out the method.

2. Description of the Prior Art

It is known to pulverize iron melts into small melt particles by means of gas jets or water jets which are directed under high pressure to a flow of the melt, so that a finely particulate iron powder is produced as a consequence of the resulting quick cooling of the melt particles. If the atomizing medium used is not oxygen-free (for example, water) and the atomization is not carried out in an inert atmosphere, an oxide skin is formed on the individual iron particles. The oxide skin constitutes an obstacle for the further processing of the iron powder, for example, in sintering metallurgy. In addition, there exists an obstacle to further processing for many applications because of hardening of the iron particles which takes place because of the extremely quick cooling, even though the carbon content is low.

For eliminating these obstacles, the oxidized iron powder obtained from the melt atomization is usually subjected to an annealing treatment in reducing atmosphere (for example, DE 37 22 956 C1).

Used for this purpose are continuous furnaces, such as conveyor-type furnaces (compare U.S. Pat. No. 4,448,746), walking-beam furnaces, or roller-hearth annealing furnaces. In these furnaces, the iron powder is placed in a loose layer, for example, on a bowl-shaped support, in the annealing furnace at temperatures of 900°–1,200° C. (in the heated furnace wall), usually above 950° C. Most of the time, a furnace atmosphere enriched with hydrogen is used for the reduction. It is also known from DE 37 22 956 C1 to reduce the consumption of hydrogen by introducing hydrocarbons (for example, natural gas) into the furnace by utilizing the effect of vapor reforming of the hydrocarbons.

The dwell time of the iron powder in the furnace depends, on the one hand, on the initial oxygen content and the desired final oxygen content, i.e., the required reduction work and, on the other hand, on the limiting conditions for the reduction, i.e., particularly the height of the layer of the iron powder, the intensity of the gas exchange, and the reduction temperature. It is essential that the hydrogen required for the reduction can completely penetrate the powder layer and the water vapor formed during the reduction can emerge from the powder layer and the furnace atmosphere. Annealing times of 1–2 hours duration are to be considered conventional. After annealing, the iron powder only has a low residual oxygen content of, for example, less than 0.2% by weight, and a soft-annealed structure.

The known iron powder reduction has the disadvantage that the reduction process requires a large amount of energy and is expensive in view of the hydrogen consumption. The long drill periods negatively affect the furnace throughput. In addition, because the primary powder particles bake together, an "iron powder cake" is formed which must essentially be dissolved again by a subsequent grinding treatment.

It is also known to carry out a direct reduction of iron oxides in a revolving cylindrical furnace. A revolving cylindrical furnace is generally understood to be a furnace with a tubular treatment space which is fired directly and is continuously rotated during use. The charged material continuously travels through the revolving cylindrical furnace. The materials to be used in the direct reduction of iron oxides are ore pieces and iron ore pellets. A relatively small fine portion can also be processed therewith. However, particularly pulverous iron ores cannot be used.

Contrary to the revolving cylindrical furnace, a continuously operating furnace with a rotating cylindrical treatment chamber space which is indirectly heated is generally called a drum furnace.

From DE 34 39 717 A1 it is known to use such a drum furnace for producing pulverous tungsten or molybdenum by calcining ammonium paratungstate or ammonium molybdate and producing tungsten oxide or molybdenum oxide. These oxides are then reduced with hydrogen to the corresponding pulverous metals. A reduction of water-atomized iron powder in a drum furnace has not yet become known. Since iron powder (particularly water-atomized iron powder) has the tendency to agglomerate to a significant extent, an expert ab initio had to consider a drum furnace unsuitable for the reduction of iron powder. This is because it would have to expected that the formation of iron lumps (due to the spattered grain shape of the powder) impairs the furnace operation in an impermissible manner and prevents a sufficient and uniform powder reduction. In addition, it would have had to be expected that fine portions of the iron powder would have to be continuously removed, together with the necessary gas exchange, for renewing the furnace atmosphere, which would have reduced the yield of the process and would have negatively affected the economic use thereof.

SUMMARY OF THE INVENTION

It is the object of the invention to provide a method for the reduction and soft annealing or spheroidizing treatment of water-atomized iron powder which substantially avoids the abovedescribed disadvantages and particularly can be carried out more quickly and with the use of less energy and reduction agent, as compared to the previous annealing methods. In addition, an arrangement for carrying out this method is to be proposed.

In accordance with the present invention, a method for the continuous reduction and soft annealing of water atomized iron powder whose powder particles are at least partially covered by an oxide skin includes conveying the iron powder in the form of a loose powder layer through an indirectly heated treatment chamber having a heating zone, a reduction zone and a cooling zone, maintaining a reducing atmosphere in the treatment chamber by a continuous supply of reduction gas and by discharging reduction products formed in the chamber, such as water vapor and carbon dioxide, revolving the powder layer at least in the reduction zone while traveling through the treatment chamber and continuously mixing the powder, maintaining the furnace temperature in the reduction zone in a range of 800° to 950° C., and permanently introducing fresh reduction gas directly into the reduction zone for controlling the dewpoint of the furnace atmosphere.

The arrangement according to the present invention for carrying out the above-described method includes a drum furnace with indirect heating. The drum furnace has a treatment chamber which is divided into three zones, i.e., a heating zone arranged at a charging end of the drum furnace, a reduction zone arranged in a middle portion of the drum furnace and a cooling zone arranged at a discharge end of the drum furnace. The treatment chamber is connected to a reduction gas supply line and a vapor discharge line. At least one inlet opening for the supply of fresh reduction gas is arranged in the reduction zone. Structural features which are movable independently of the wall of the drum are provided at least in the reduction zone. In addition to the revolving of the iron powder due to the rotation of the drum, the structural features mix the iron powder.

The essence of the invention not only resides in that it provides for the application of a method principle already known for the reduction of other materials, in which the pulverous treatment material is continuously revolved to a water-atomized iron powder. Rather, the invention provides the prerequisite for utilizing this principle which, because of the extreme agglomeration tendency of this iron powder, did not appear practically useful, by simultaneously limiting the annealing temperature in the reduction zone to values of between 800°–950° C. and the direct introduction of fresh reduction gas for the locally specific control of the dewpoint in the furnace atmosphere of the reduction zone.

In conventional reduction methods, the fresh reduction gas is usually introduced at the discharge end of the annealing furnace in a counterflow to the iron powder, while the vapors are drawn off at the charging side of the annealing furnace. A specifically controlled influence on the furnace atmosphere within the reduction zone is not carried out. As a result, depending on the vertical location of the iron powder particles within the stationary iron powder layer, the iron powder particles are brought into contact with reduction gas having a different water content because, due to the reduction processes which take place, the reduction gas is continuously further enriched with water vapor and, therefore, has a continuously increasing dewpoint, as compared to the original fresh reduction gas. In accordance with the invention, the specifically controlled supply of fresh reduction gas in the reduction zone makes it possible to maintain the dewpoint of the furnace atmosphere locally on the desired level. Because of the continuous revolving and mixing of the iron powder, it is possible that virtually all iron powder particles come into contact with a reduction gas whose dewpoint is at a substantially lower level, as compared to the lower levels of the static powder layer in the conventional annealing methods. Consequently, it is possible, depending on the material quality, to substantially reduce the reduction temperature, as compared to the state of the art, without having to expect disadvantages with respect to the remaining residual oxygen content of the iron powder or the required annealing times. The combination of features according to the present invention produced the surprising result that a lump formation of the iron powder during the annealing treatment which had to be expected was prevented or could be maintained at a level which could be handled easily.

The invention was able to achieve this without having to admix pulverous additional materials, such as calcium oxide, calcium fluoride, magnesium oxide, sodium carbonate, titanium dioxide, or similar materials, to the iron powder to be reduced in the drum furnace, as it is known from DE-C 29 21 786. In the method described in DE-C 29 21 786, the raw material used is not a water-atomized iron powder, but a comminuted (ground) iron oxide powder wherein 5%–30% by weight of these pulverous additional materials are admixed to avoid the formation of an agglomerate. After the reduction has been carried out, the additional materials must again be separated in an additional work step. In contrast, the method according to the invention represents a substantially simpler and less expensive procedure. The above statement is similarly applicable to the comparison with the reduction method for metal powder known from DE-A 27 31 845, which is also carried out in a drum furnace. This known method provides initially to mix the metal powder with organic materials, such as dextrose, starch, organic acids, oils, alcohols, waxes, or greases and derivatives thereof and to reduce only thereafter. In addition, it is recommended, prior to treatment in the reduction furnace, to compress the metal powder into pieces, i.e., to render the powder extremely coarse-grained (for example, with a grain size of 8 mm). The method according to the invention does not require such features, i.e., particularly the admixing of pulverous or liquid-added materials to the iron powder to be treated.

DESCRIPTION OF THE PREFERRED EMBODIMENTS

Figure 1:
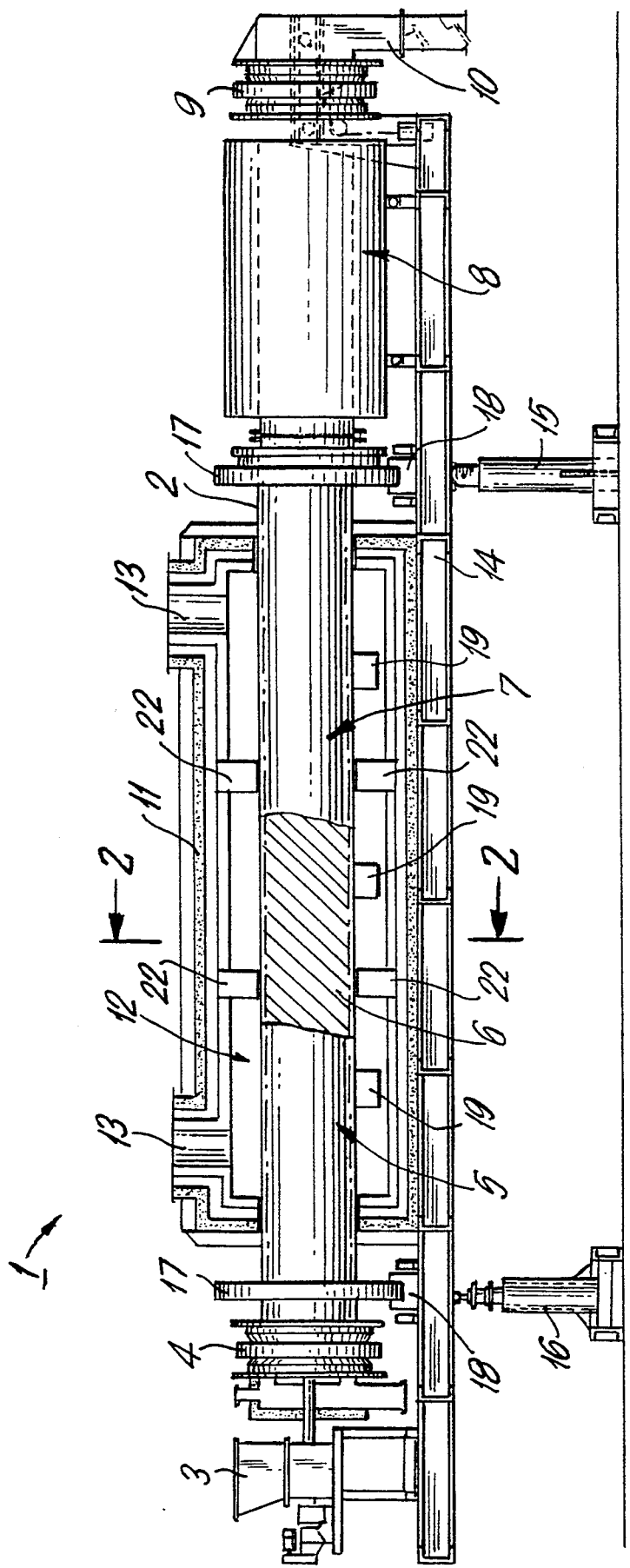
FIG. 1 shows a longitudinal sectional view of the drum furnace according to the invention.
Figure 2:
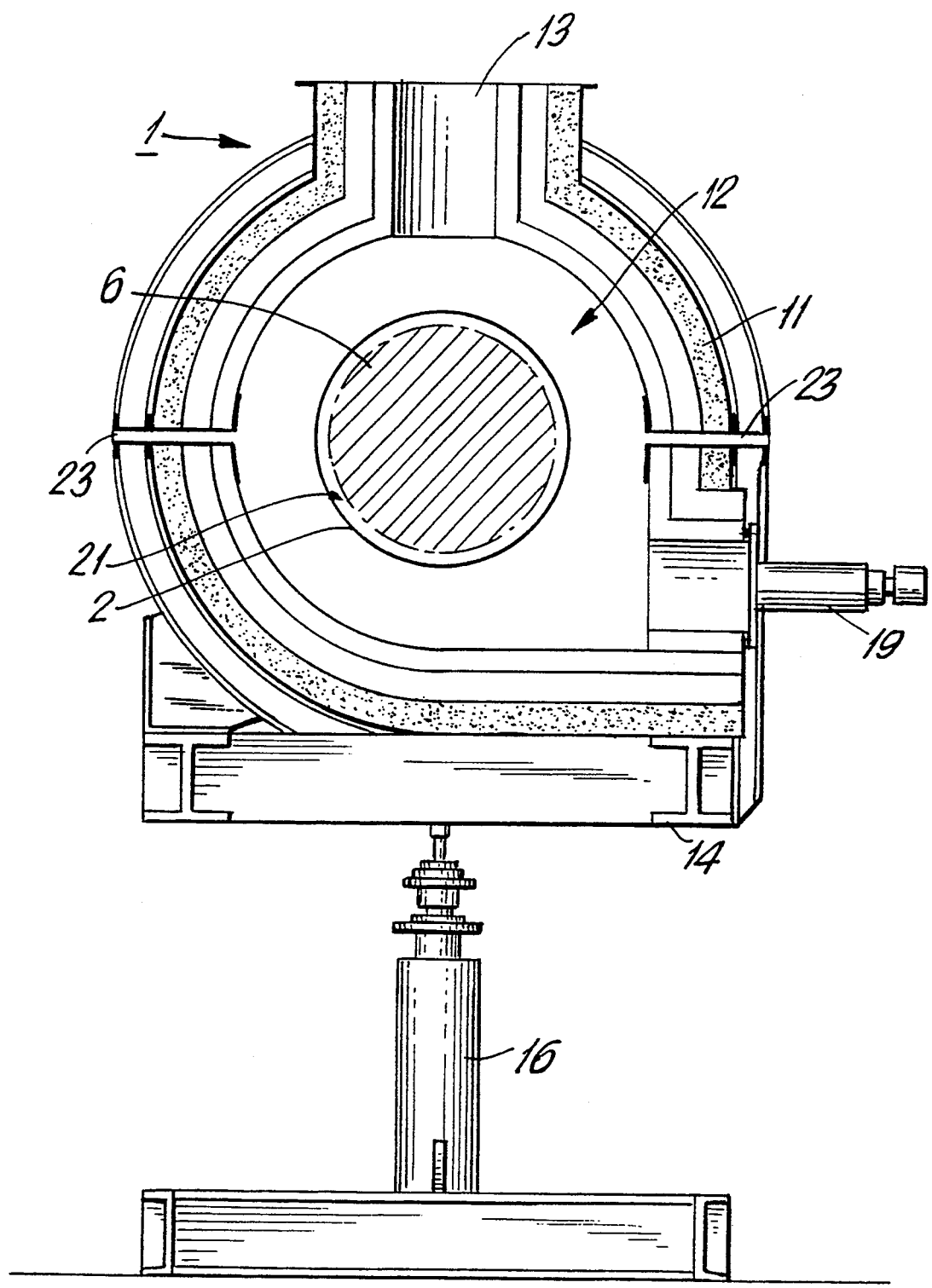
FIG. 2 shows a cross-sectional view along line A—A of FIG. 1.

The drum furnace 1 shown in FIG. 1 for the reduction of water-vaporized iron powder is mounted on a support frame 14. The core of the drum furnace 1 is a tubular, rotatable drum 2 which surrounds the treatment space for the iron powder which is shielded from the outer atmosphere. The support frame 14 is supported on a first support member 15 through a hinge having a horizontal axis of rotation and a second vertically adjustable support member 16, so that the inclination of the drum 2 can be adjusted at the support member 16. The dwell time of the iron powder in the drum 2 can be directly influenced by the selection of the inclination and the rate of rotation of the drum 2. The drum 2 is over a portion of its axial length surrounded by a multiple-layer outer wall 11 which is provided with a thermal insulation and which includes the furnace chamber 12 for the indirect heating of the drum 2. The sectional view of FIG. 2 shows that the outer wall 11 is horizontally divided and that a sealing member 23 is provided in the plane of division. Heating is carried out by means of one or more gas or oil burners 19. It is essentially possible to use any other heat source. The exhaust gases produced during the combustion of the fuel used are discharged to the outside through exhaust gas pipes 13. In order to facilitate a controlled temperature pattern along the axis of the drum 2, baffle walls 22 can be provided in the combustion chamber 12 for dividing the combustion chamber into several sections.

To be able to rotate the drum 2 by means of a motor, the drum 2 has, outside of the combustion chamber 12 and the outer wall 11, two drum wheels 17 which rotate on drum drives 18, which are equipped with rollers and are fastened to the support frame 14.

The iron powder to be reduced in the drum 2 reaches the interior of the drum 2, i.e., the treatment chamber divided into three zones, through a powder charging device 3 by means of a conveyor system (for example, a screw conveyor) through the lock 4 arranged on the left end face of the drum 2. The three zones of the treatment chamber are the heating zone 5 at the charging end of the furnace, the reduction zone 7 following the heating zone, and the cooling zone 8 arranged at the discharge end of the furnace.

The zone immediately following the lock 4 is constructed as heating zone 5 and, thus, extends into the area of the furnace where the heating begins. In this heating zone 5, the iron powder which has been introduced is heated to reduction temperature (at least approximately 800° C., but at most 950° C.). It is advantageous to carry out heating as quickly as possible. It is essential that the powder layer is continuously revolved during the treatment. An effective mixing of the material must be carried out, at least also in the reduction zone 7. This is achieved by continuously rotating the drum 2, which in cross section is filled only to a relatively small extent. The intensity of the revolving of the powder layer must be such that a high friction between the powder particles is achieved. As a result of this and because of the relatively low furnace temperatures, a lump formation of the water-atomized iron powder which, because of its spattered grain shape with many fissures, has a particularly high tendency to the formation of agglomerates, is substantially reduced or even entirely prevented. The mixing of the iron powder can be particularly enhanced by special features 6 which are only schematically illustrated in FIGS. 1-2.

Figure 3:
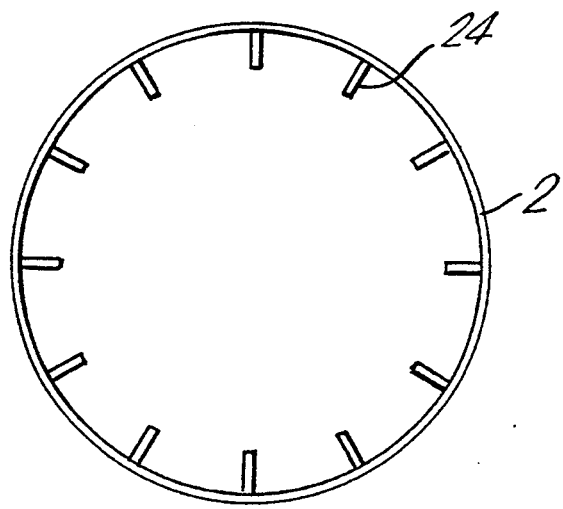
FIGS. 3-4 show different features mounted in the treatment space of the drum furnace.
Figure 4:
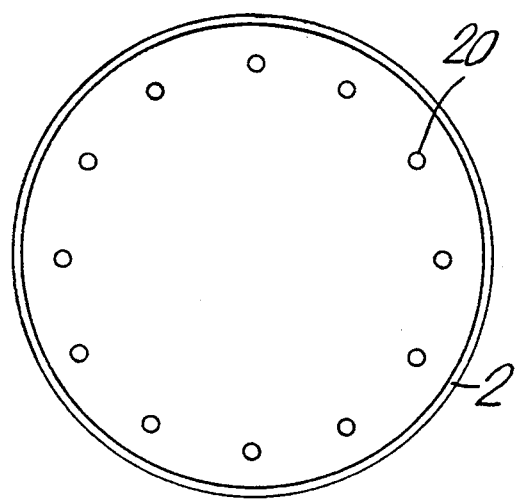

Suitable for this purpose are, for example, mixing ledges 24 (FIG. 3) which are mounted on the inner surface of the drum 2. However, it is also possible to use mixing baskets, with or without their own drives, mounted independently of the drum 2. FIG. 4 schematically shows such a mixing basket 20 whose mixing ledges are constructed, for example, tubular.

Figure 5:
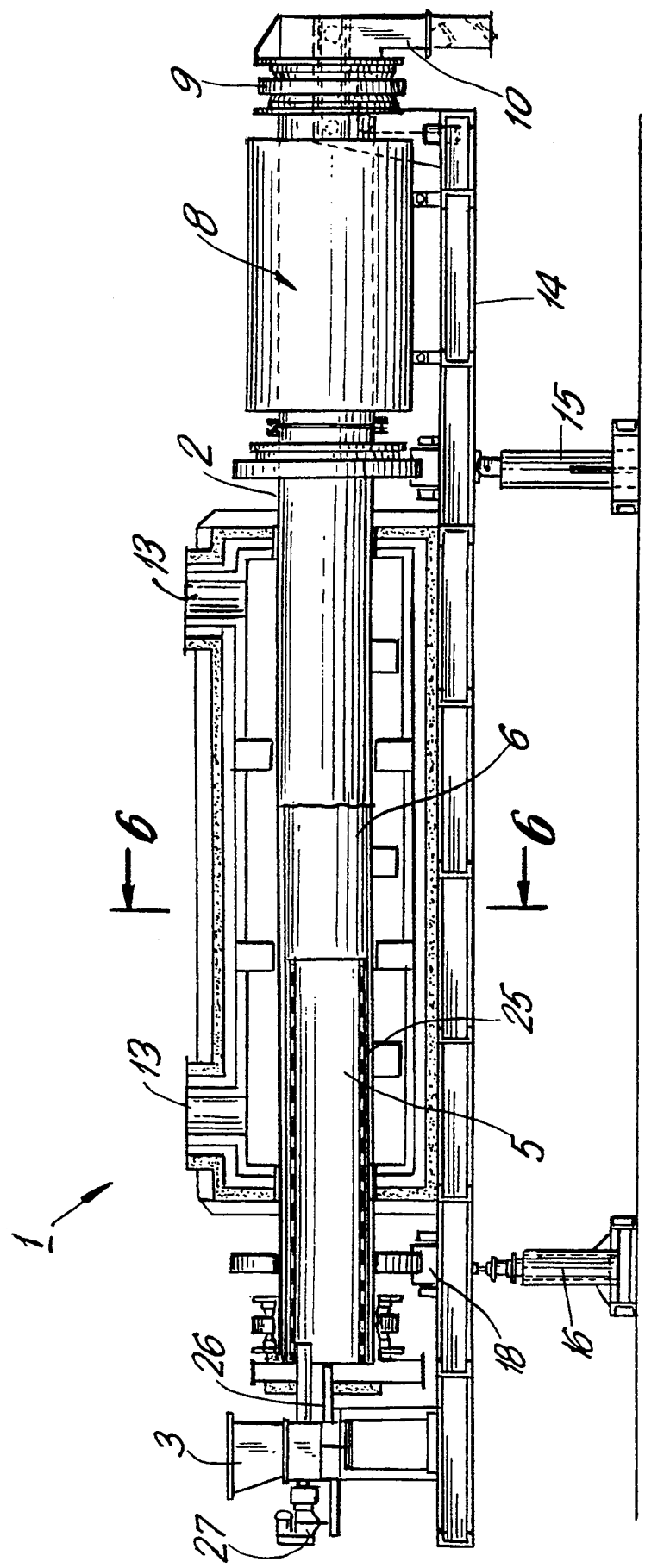
FIG. 5 shows a drum furnace which is modified as compared to the drum furnace of FIG. 1.
Figure 6:
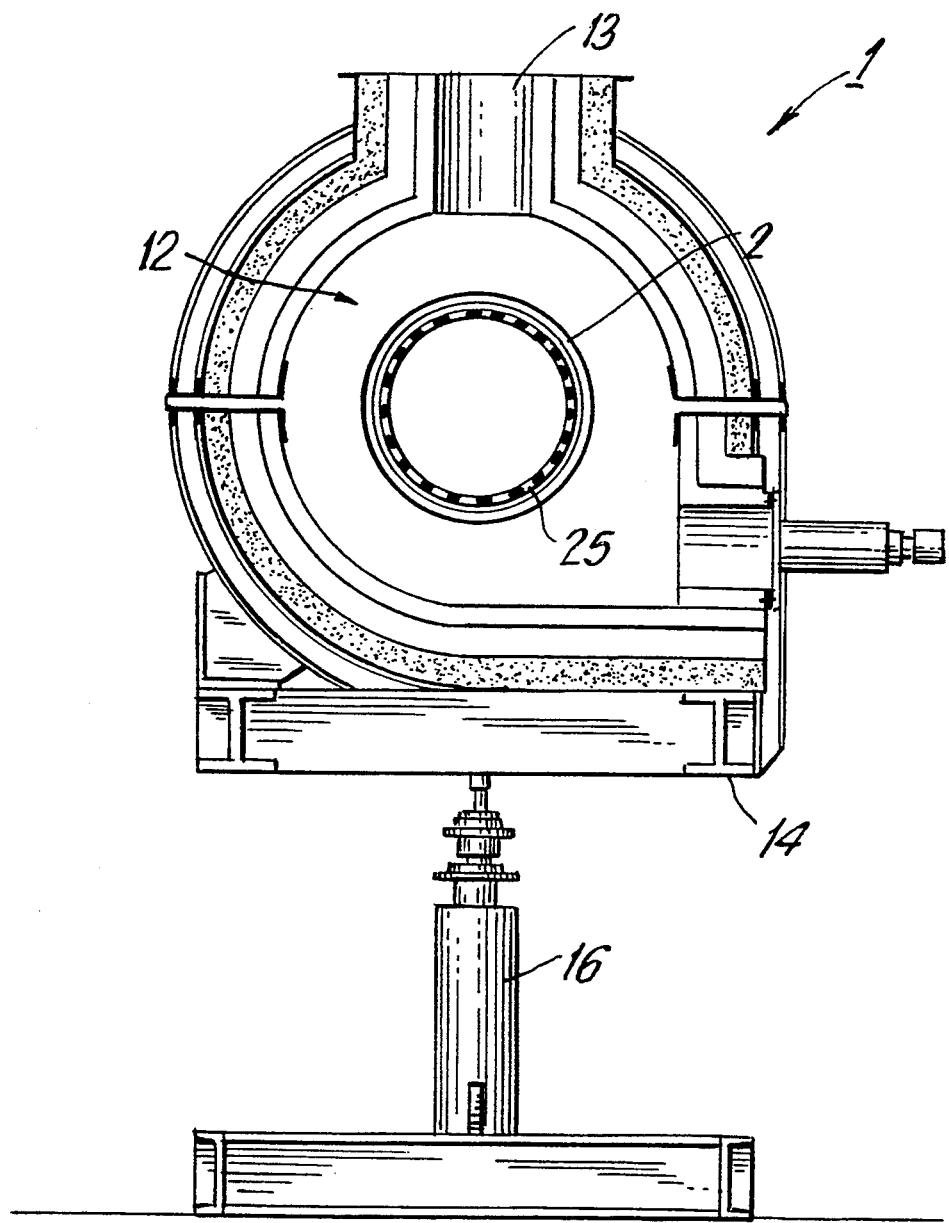
FIG. 6 is a cross-sectional view along line B—B of FIG. 5.

However, it is also possible to utilize other mixing devices, such as screw conveyors or helically shaped components which can move with or against the principal conveying direction of the iron powder (produced by the rotation of the drum). Separately driven features 6 have the particular advantage that they can almost entirely prevent the iron powder from baking onto the inner surface of the drum 2. For separating any baked-on iron powder from the drum, it is also possible to provide one or more knocking devices at the outer side of the wall of the drum 2 which produce mechanical vibrations at certain intervals by applying hammer blows to the drum wall. It has been found particularly advantageous if the drum 2 of the drum furnace 1 has in the heating zone an inner screen-like intermediate layer facing the treatment chamber, as can be seen in FIGS. 5-6. This is because tests have shown that the arrangement of such a screen-like intermediate layer closing adjacent the drum wall makes it possible to substantially reduce or entirely prevent baking-on effects of the iron powder to be treated on the drum wall. As a consequence, the effect of lump formation of the powder particles among each other can also essentially be eliminated.

The screen-like intermediate layer is preferably constructed as a screen basket 25 which, in a particularly preferred embodiment of the invention, is connected to a swinging or shaking device 27 through a rod system 26 extending out of the drum 2 at the left end face thereof. The swinging or shaking device 27 may be a conventional swinging and shaking motor which is operated periodically in order to vibrate the screen basket 25 arranged within the furnace 1 and to thereby provide an additional measure for avoiding the baking-on of iron powder. The shaking results in a scraping action, so that any iron powder which has baked on can again be separated. The screen layer may be formed, for example, by suitable perforated sheet metal through which the iron powder particles can easily penetrate. The mesh width of such perforated sheets may be, for example, approximately in the range of 5–15 mm. It is essential that the screen-like intermediate layer ensures a heat transfer sufficient for maintaining the desired temperature range in the interior of the furnace.

In order to prevent the formation of lumps and for dissolving any already formed agglomerates, in accordance with an advantageous further development of the invention, pieces of ballast material (for example, in the form of iron spheres) can be added to the iron powder to be treated. This ballast material can produce a certain grinding effect on the agglomerates and increase the friction between the iron powder particles. After passing through the drum furnace 1 and after separating it from the iron powder, the ballast material is again returned in a cycle to the input of the drum 2, or the ballast material is held back within a furnace zone by barriers which only permit the iron powder to pass through. Because the particle size is substantially greater than that of the iron powder, the separation can be carried out very easily and without complicated measures. Within the scope of the invention, the addition of ballast material is usually not required.

The heating zone 5 is followed in conveying direction of the iron powder by the actual reduction zone 7 in which features 6 are also provided for increasing the mixing action of the powder. Different features 6 can be used in the individual sections of the drum 2. Thus, screws are particularly suitable for the front portion of the heating zone 5 and the front portion of the reduction zone 7, and mixing ledges for the reduction zone 7.

To the extent possible, especially in the drum furnace sections having higher temperatures, a more intense mixing of iron powder is effected than in the sections having lower temperatures. The iron powder, which travels slowly through drum 2 because of the slight inclination of the continuously rotating drum 2, is subjected to a reducing atmosphere in reduction zone 7, particularly an atmosphere produced by the admission of hydrogen gas at furnace temperatures of at least 800° C. The fresh reduction gas is introduced directly, preferably simultaneously, into the reduction zone 7 at different locations which are spaced apart from each other in axial direction of the drum 2, and the reduction gas is directed as much as possible in a counterflow to the direction of transportation of the iron powder.

The reduction gas should have a dewpoint which is as low as possible, particularly a dewpoint of lower than −60° C. Moreover, preferably several corresponding outlets for the discharge of vapors from the reduction zone 7 are provided. In this manner it is possible to bring the oxide skin to be reduced of practically all iron powder particles, together with the vigorous mixing and revolving of the iron powder layer, into contact with a reduction gas having a comparatively low dewpoint, although the reduction processes by means of hydrogen gas continuously produce water vapor. By contrast, the reduction conditions of conventional iron powder reduction methods, with a stationary iron powder layer and reduction gas supplied from the discharge side and vapor removal from the charging side, of the annealing furnace are substantially less favorable.

In order to make it possible to influence the furnace atmosphere in a controlled manner and additionally to improve the temperature pattern within the drum 2, it may be advantageous to arrange separating plates within the interior of the drum 2 which separate the treatment chamber, particularly the reduction zone 7, into separately controllable sections (for example, two or three) which are mounted in such a way that there is a gap 21 between the circumference of the plate and the inner wall of the drum 2 through which the transportation of the iron powder in axial direction during rotation of the drum 2 is possible. The locations of the supply and discharge of the reduction gas and of the vapors must always be distributed along the drum axis in dependence on the material throughput, so that the dewpoint of the furnace atmosphere can be influenced in a locally controlled manner, i.e., within advantageous limits. The downward limitation of the dewpoint results from economical reasons, because a low dewpoint results in an increase of the consumption of reduction gas. The supply lines for reduction gas and discharge lines for vapors are not illustrated in the figures. Advantageously, these lines are arranged in the region of the longitudinal axis of the drum 2. When hydrogen is used, the consumption of reduction gas can easily be limited to values of 80-100 Nm$^3$/t iron powder.

In the illustrated case, the reduction zone 7 is divided by means of the separating walls 22 in the combustion chamber 12 into two portions which can be heated to a different extent. The furnace temperature in the reduction zone 7 is limited to at most 950° C. In the case of unalloyed or low-alloyed iron powder, it is even advantageous to limit the furnace temperature to at most 900° C., while preferably higher furnace temperatures of up to 950° C. are used in the case of higher-alloyed iron powder. Accordingly, the reduction temperature in the method according to the invention is significantly lower (i.e., by approximately 150°-250° C.), as compared to conventional iron powder reduction (approximately 900°-1,200° C., depending on the alloying degree of the powder).

The drum furnace according to the invention is mechanically controlled in such a way that the dwell time of the iron powder in the reduction zone is significantly less than one hour. Advantageous dwell times are 15-20 min. Also, in this respect, the method of the invention differs substantially from previous methods in which dwell times of approximately 1-2 hours were used. These technical measures (relatively low reduction temperature, short dwell time, intensive powder mixing, low dewpoint of the furnace atmosphere) make it possible to avoid almost entirely the formation of agglomerates during the reduction operation.

The cooling zone 8 follows the reduction zone 7. In the cooling zone 8, the reduced iron powder is indirectly cooled to below 100° C. The heat removal takes place with the use of, for example, cooling water which may be utilized, for example, for heating purposes outside of the reduction annealing method. However, it is also possible to use the waste heat partially for preheating the used fuel of the combustion air and of the reduction gas being utilized.

A lock 9 is again arranged at the end of the cooling zone 8. The lock 9 makes possible the continuous removal of the reduced iron powder without impairing the furnace atmosphere in the interior of the drum 2. A powder discharge device 10 mounted on the lock 9 makes possible the problem-free filling of the iron powder into transportation containers.

In the following, the effectiveness of the method of the invention is explained in more detail with the aid of an example carried out in a test furnace.

An iron melt having the following composition (% by weight) was atomized in the conventional manner by water atomization:

0.01% C 0.03% Si the remainder being iron and the usual impurities.

The produced iron powder had essentially a grain size in the range of 30–400 μm (average grain 90 μm) and had an oxygen content of approximately 0.9%–1.1%. The grain shape was spattered. After drying, this iron powder was continuously fed into the treatment chamber of an indirectly heated drum furnace. The diameter of the drum (treatment chamber) was 300 mm. The iron powder filled out approximately 5%–15% of the cross-sectional area of the drum. The heated part of the drum furnace (heating zone and reduction zone) was divided into separately heatable sections. Seen in transportation direction of the iron powder, the adjusted furnace temperatures were 850° C., 900° C., and 950° C., respectively. The drum wall was equipped in the interior with mixing ledges in the areas of the heating zone and of the reduction zone.

The inclination of the drum axis toward the discharge end was adjusted in such a way that a rate of rotation of the drum of approximately 1.6 rpm resulted in a dwell time of approximately 30 minutes in the reduction zone. In the cooling zone following the reduction zone of the drum furnace, the iron powder was cooled to approximately 50° C. The reduction gas used was pure hydrogen having a dewpoint of approximately −60° C. The consumption of reduction gas was approximately 90 Nm$^3$/t iron powder. The fuel consumption was approximately 65 Nm$^3$ natural gas/t iron powder. The furnace operation was carried out without problems. The reduced iron powder had a residual oxygen content of less than 0.17%. The powder structure almost completely corresponded to that of the original grains. Only slight amounts of agglomerates were formed. These agglomerates remained below a maximum size of approximately 20 mm, and it was possible to return them to the primary grain size from the water atomization by comminuting them by hand. The success of the reduction annealing was obtained without limitation even in the interior of these small agglomerates. The powder produced in this manner was very suitable for compressing into compressed bodies.

The annealing method according to the invention results in a number of important advantages. Thus, the required dwell time of the iron powder in the reduction furnace can be reduced, compared to conventional annealing, for example, in a conveyor-type furnace with the same initial and final oxygen content, to a value corresponding to approximately one-third of the earlier value. This results in high material throughputs, while the expenses for the arrangement are relatively low. In addition, the shorter dwell time substantially reduces the specific fuel consumption, namely, to approximately half that of the earlier value. Moreover, the consumption of reduction gas can be significantly lowered. These effects together result in a significant savings in the production costs.

Because of the lower reduction temperature, the effect of primary powder particles baking together into larger agglomerates, which always occurred in conventional annealing treatment, no longer occurs, or at least any agglomerates which have been formed can be again comminuted into the original primary particles with the application of little force and without destroying the structure thereof. After a conventional annealing treatment, it was always necessary to carry out a subsequent grinding treatment which, in addition to the expenses, had the disadvantage that it resulted in iron powder particles which had a different particle structure than the primary particles. The method according to the invention, on the other hand, produces a powder whose grain-size curves correspond almost completely to those of the original raw powder.

In the method according to the invention, the gas exchange of the furnace atmosphere discharges practically no iron dust, even though the iron powder being treated has a very fine particle size. Another significant advantage is to be seen in the fact that the method according to the invention makes possible a fully continuous and completely automated operation between the material supply container and the discharge into transportation containers, wherein a complete enclosure of the atmosphere is ensured. The bowl-shaped members previously required for conveying the iron powder in roller-hearth annealing furnaces or walking-beam furnaces or the requirement of conveyor belts in conveyor-type furnaces are completely unnecessary, so that the invention results in a method requiring significantly less manipulation and repair. Because of the high effectiveness of the method, the space requirement for an arrangement according to the invention in relation to the material throughput is substantially lower than previously. The continuous movement of the powder layer during the annealing treatment makes possible an extremely homogenous product quality on a constantly high level.

Compared to conventional annealing furnaces, the process in a drum furnace can be influenced more easily and in a more controlled manner. Since the wear of the arrangement, especially because of the substantially lower reduction temperatures and the complete elimination of parts of a job particularly subject to wear, is significantly reduced, the availability of the entire arrangement is significantly increased while simultaneously drastically reducing the expenses for maintenance and repair.

We claim:

1. A method for the continuous reduction and soft annealing of water atomized iron powder, the iron powder comprising powder particles which are at least partially covered by an oxide skin, the method comprising conveying the iron powder in the form of a loose powder layer through an indirectly heated treatment chamber having an axial direction, the treatment chamber comprising a heating zone, a reduction zone and a cooling zone, maintaining a reducing atmosphere in the treatment chamber by continuously supplying reduction gas and by discharging reduction products formed in the treatment chamber, continuously revolving the powder layer at least in the reduction zone while the powder layer is being conveyed through the treatment chamber, maintaining a furnace temperature in the reduction zone in a range of 800° to 950° C., and continuously introducing fresh reduction gas directly into the reduction zone for controlling the dewpoint within the treatment chamber.

2. The method according to claim 1, comprising discharging the reduction products directly from at least one location within the reduction zone.

3. The method according to claim 1, comprising supplying the reduction gas into the reduction zone at a plurality of locations which are axially spaced from each other.

4. The method according to claim 1, wherein the treatment chamber has a rotatable wall, comprising revolving and mixing the iron powder layer by rotating the wall of the treatment chamber.

5. The method according to claim 1, wherein the iron powder is low-alloy iron powder, comprising maintaining the furnace temperature in the reduction zone below 900° C.

6. The method according to claim 1, comprising adjusting the dewpoint of the reduction gas introduced into the reduction zone to −60° C. or below.

7. The method according to claim 1, wherein the heating zone has an end region and the reduction zone has a beginning region, comprising mixing the iron powder more vigorously in the end region of the heating zone and at least in the beginning region of the reduction zone than in remaining regions of the treatment chamber.

8. The method according to claim 4, comprising mixing the iron powder by using mixing devices operating independently of the rotation of the wall of the treatment chamber.

9. The method according to claim 1, comprising adding ballast material pieces for increasing the friction between the iron powder particles during revolving and mixing the iron powder.

10. The method according to claim 1, comprising adding iron spheres for increasing the friction between the iron powder particles during revolving and mixing the iron powder.

11. The method according to claim 1, comprising using hydrogen as the reduction gas and limiting the supply of hydrogen to approximately 80 to 100 $Nm^3$ per t iron powder.

12. The method according to claim 1, wherein the dwell time of the iron powder in the reduction zone is approximately 15 to 20 minutes.

* * * * *